(12) United States Patent
Henry et al.

(10) Patent No.: US 10,683,602 B1
(45) Date of Patent: Jun. 16, 2020

(54) DUAL-CLIP CLOTHESPIN FOR CLOTHES-DRYING SYSTEM

(71) Applicants: David Lee Henry, Edina, MN (US); Joe Bruce Scott, Lubbock, TX (US)

(72) Inventors: David Lee Henry, Edina, MN (US); Joe Bruce Scott, Lubbock, TX (US)

( * ) Notice: Subject to any disclaimer, the term of this patent is extended or adjusted under 35 U.S.C. 154(b) by 81 days.

(21) Appl. No.: 16/012,266

(22) Filed: Jun. 19, 2018

Related U.S. Application Data

(63) Continuation-in-part of application No. 15/827,523, filed on Nov. 30, 2017.

(51) Int. Cl.
*D06F 55/02* (2006.01)
*F16B 2/10* (2006.01)
*A47G 25/48* (2006.01)

(52) U.S. Cl.
CPC ........... *D06F 55/02* (2013.01); *A47G 25/483* (2013.01); *F16B 2/10* (2013.01)

(58) Field of Classification Search
CPC ......... D06F 55/02; D06F 55/00; A47G 25/00; A47G 25/52; A47G 25/481; A47G 25/488; F16B 2/00; F16B 2/10; F16B 2/20; F16B 2/24; A45F 5/02; A45F 5/06; A41D 27/22
USPC ...................... D8/394, 395; D6/326; D32/61
See application file for complete search history.

(56) References Cited

U.S. PATENT DOCUMENTS

| | | | | |
|---|---|---|---|---|
| 884,680 | A * | 4/1908 | Polakoskey | D06F 55/00 24/507 |
| 2,209,697 | A * | 7/1940 | Kislingbury | D06F 55/00 24/327 |
| 2,615,221 | A * | 10/1952 | Linton | D06F 55/02 24/501 |
| 2,666,240 | A * | 1/1954 | Maccaferri | A47G 25/485 24/501 |
| 3,084,410 | A * | 4/1963 | Paul, Jr. | D06F 55/00 24/507 |
| 3,456,262 | A * | 7/1969 | Coon | A47G 25/485 24/501 |
| 4,175,306 | A * | 11/1979 | Bigelow | A47G 25/485 24/507 |
| 6,241,133 | B1 * | 6/2001 | Morgan | A47G 25/483 223/91 |
| 6,612,000 | B2 * | 9/2003 | Housley | A47G 25/485 223/91 |
| 8,201,310 | B1 * | 6/2012 | Abdi | A47G 25/48 24/499 |

* cited by examiner

*Primary Examiner* — Ismael Izaguirre
(74) *Attorney, Agent, or Firm* — Keeley DeAngelo LLP; W Scott Keeley

(57) ABSTRACT

A clothespin with two clipping actions has a distal closure end and a proximal lever end. The distal closure end is either spring-actuated or drawn closed by elastic band; and a proximal, lever end has a slide-and-catch mechanism that allows the clothespin to be slid upwardly and secured upon a provided structure such as a line, cord, rod or hanger.

6 Claims, 6 Drawing Sheets

US 10,683,602 B1

DUAL-CLIP CLOTHESPIN FOR CLOTHES-DRYING SYSTEM

This application is a continuation in part of application Ser. No. 15/827,523.

TECHNICAL FIELD

The present invention relates in general to clasps, clips, support-damps or components thereof having a gripping member formed a resilient member with position locking-means for engaging faces.

BACKGROUND

Air-drying of garments is commonly done by hanging the garments on standard clothes hangers or clotheslines. Clips or clothespins are commonly used for hanging clothes to dry. Many variations of the clothespin have been developed for various uses. One variation employs a pivot between a lever operated proximal end and a jaw or clamp mechanism at a distal end. The distal end is manipulated by the levers at the proximal end, actuating a spring against a pivot to open the distal end of the clothespin.

SUMMARY

The present invention is a clothespin with two clipping actions. In a first iteration the clothespin is comprised of two identical components engaged about a pivot. The clothespin's distal end is a closure end. A pivot resides between the distal end and proximal end. At the proximal end the two components form levers that open and close the distal end about the pivot. A spring holds the closure normally closed. A secondary closure is formed within the proximal end by symmetrical halves in each component. The apparatus is constructed to clip onto a further structure such as a cord, line, rod or hanger. The clothespin has a closure end and two-pronged proximal lever ends with the prongs joined at their centers against a central rocking fulcrum otherwise referred to as a pivot. By lever action, when the two prongs are pinched at the proximal end of the clothespin, the prongs open. When released, an elastic band draws the two prongs shut, creating the action necessary for gripping at the distal end. The prongs of this clothespin embodiment have semi-cylindrical through-holes in combination with a pair of mated inclined planes that snap onto a horizontally disposed cord, line, rod, hanger or other structure.

In a second iteration, the clothespin has a similar distal closure end and two-pronged proximal lever end with the prongs joined at their centers against a central spring fulcrum. By lever action, when the two prongs are pinched at the proximal end of the clothespin, the prongs open. When released, the spring draws the two prongs shut, creating the action necessary for gripping at the distal end. The prongs of this clothespin embodiment have semi-cylindrical through-holes in combination with mated inclined planes that snap onto a horizontally disposed cord, line, rod, hanger or other structure.

Other objects and features will become apparent from the following detailed description considered in conjunction with the accompanying drawings. Drawings are meant to illustrate rather than limit the invention.

BRIEF DESCRIPTION OF THE DRAWINGS

To assist those of skill in the art in understanding the disclosed dual-clip clothespin, reference is made to the accompanying figures, wherein.

DETAILED DESCRIPTION OF THE DRAWINGS

Figure 1:
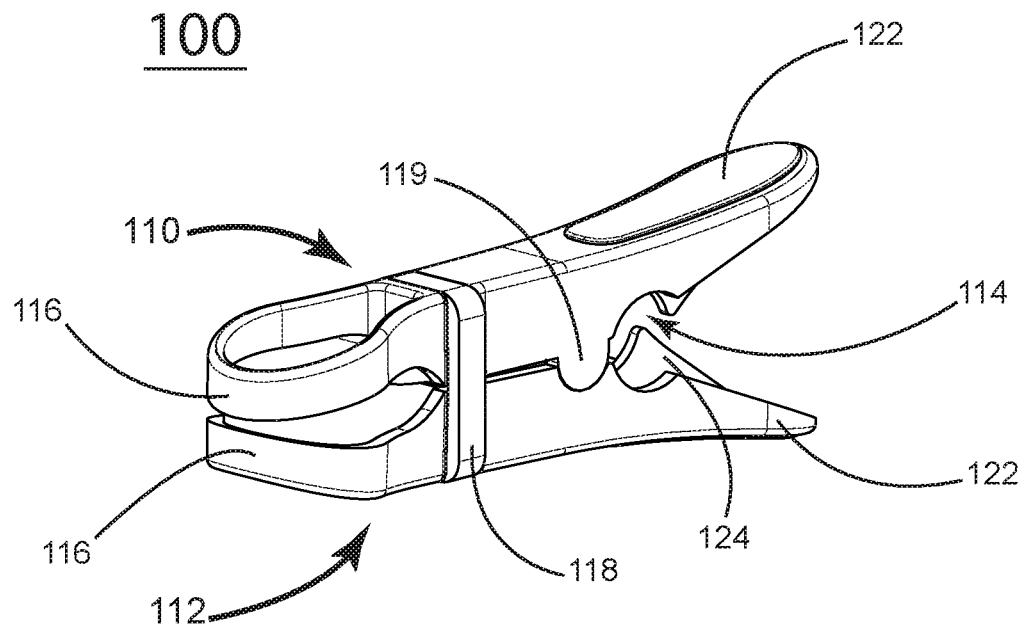
FIG. 1 is a front perspective view of the embodiment.

In FIG. 1, a dual-clip clothespin 100 has an upper prong 110 engaged by an elastic band 118 with a matching lower prong 112. A semi-circular through-hole 114 in the proximal end of each prong 110, 112 acts as a "rod clip," allowing the clothespin to be manually clipped at its proximal end to a separate horizontal structure such as a clothesline, a rod or the horizontal cross-member of a typical hanger. The clothespin has a distal closure end 116 and a two-pronged proximal lever end 122 with the prongs joined at their centers against a central rocking fulcrum comprised of a paired projection 119 and notch 120.

Figure 2:
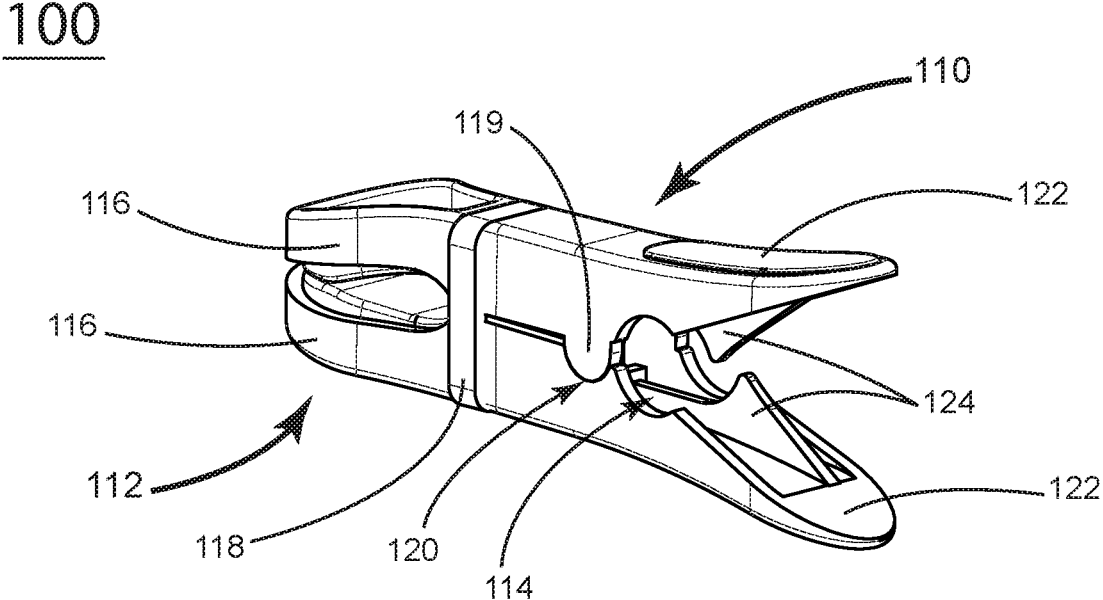
FIG. 2 is a rear perspective view of the embodiment.

In FIG. 2, rear view, the dual-clip clothespin 100 has an upper prong 110 engaged by an elastic band 118 with a matching lower prong 112. A semi-circular through-hole 114 in the proximal end of each prong 110, 112 acts as a catch at the end of the ramped guide 124 integral to the proximal lever end 122. Parts 114, and 124 on each prong 110, 112 are together referred to as a rod clip. In use, the clothespin is manually slid perpendicularly against a provided cord, line, rod, or hanger cross member, so that the provided rod slides along the ramped guide 124 until caught in the through-hole 114. The elastic band 118 holds the closure ends 116 secured upon a provided garment. The paired projection 119 and notch 120 remain stationary.

Figure 3:
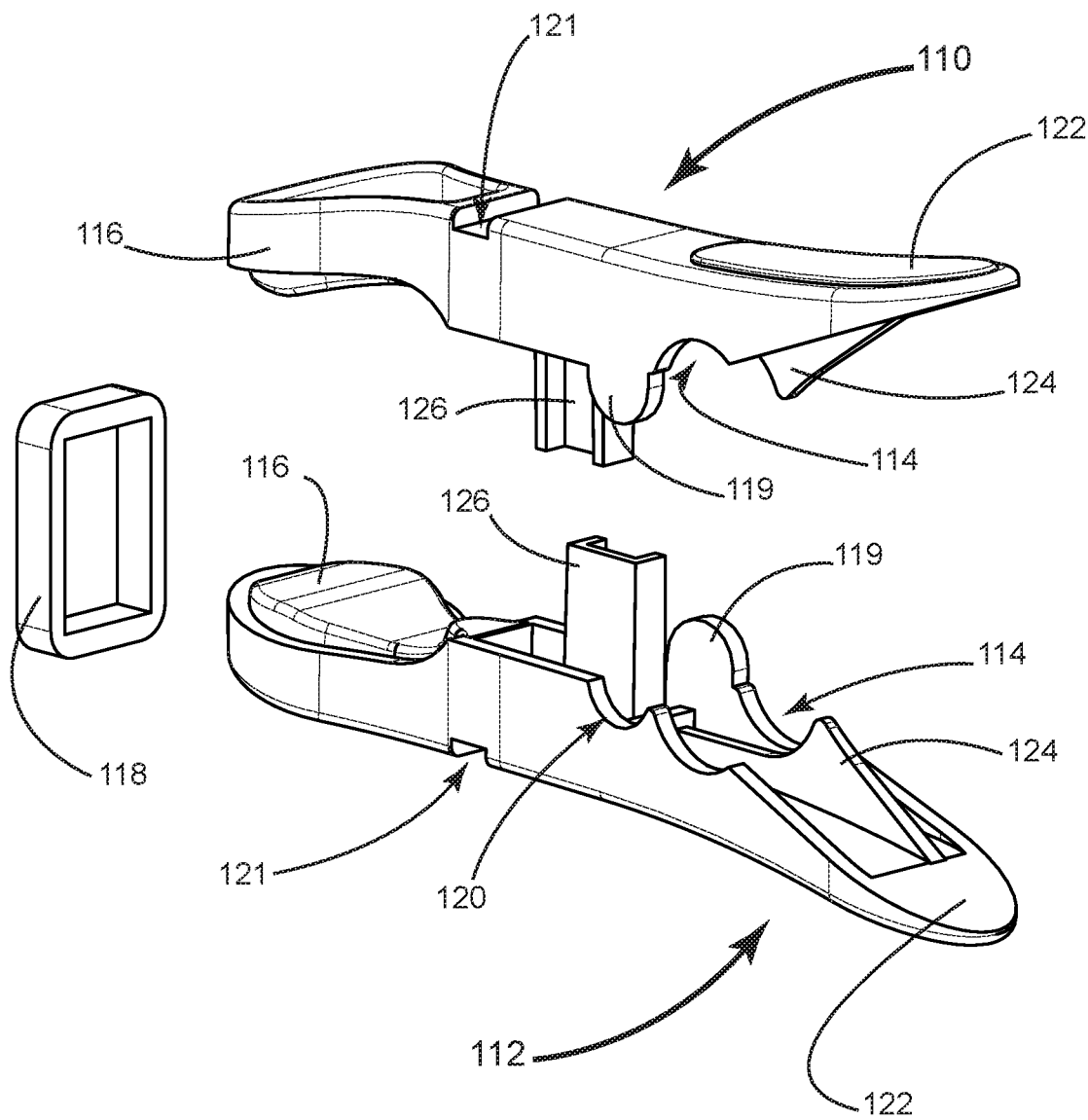
FIG. 3 is an exploded, rear-perspective view of the embodiment.

In FIG. 3 an exploded view of the dual-clip clothespin 100 shows a two-part inner structural member 126 which secures the upper prong 110 to the lower prong 112. A channel 121 holds the elastic band 118 in place. Other parts, unchanged and shown for reference, are: semi-circular through-hole 114; closure ends 116; projection 119; notch 120; proximal lever ends 122; and ramped guide 124. The upper prong 110 and lower prong 112 are identical parts. The upper prong 110 and lower prong 112 are symmetrical about a central, vertical plane that extends from the proximal end of each prong to the distal end of each prong. The identical parts 110/112 mate when one is inverted with respect to the other. For example, notch 120 of prong 112 engages pivotally with projection 119 of prong 110 and notch 120 of prong 110 engages pivotally with projection 119 of prong 112.

Figure 4:
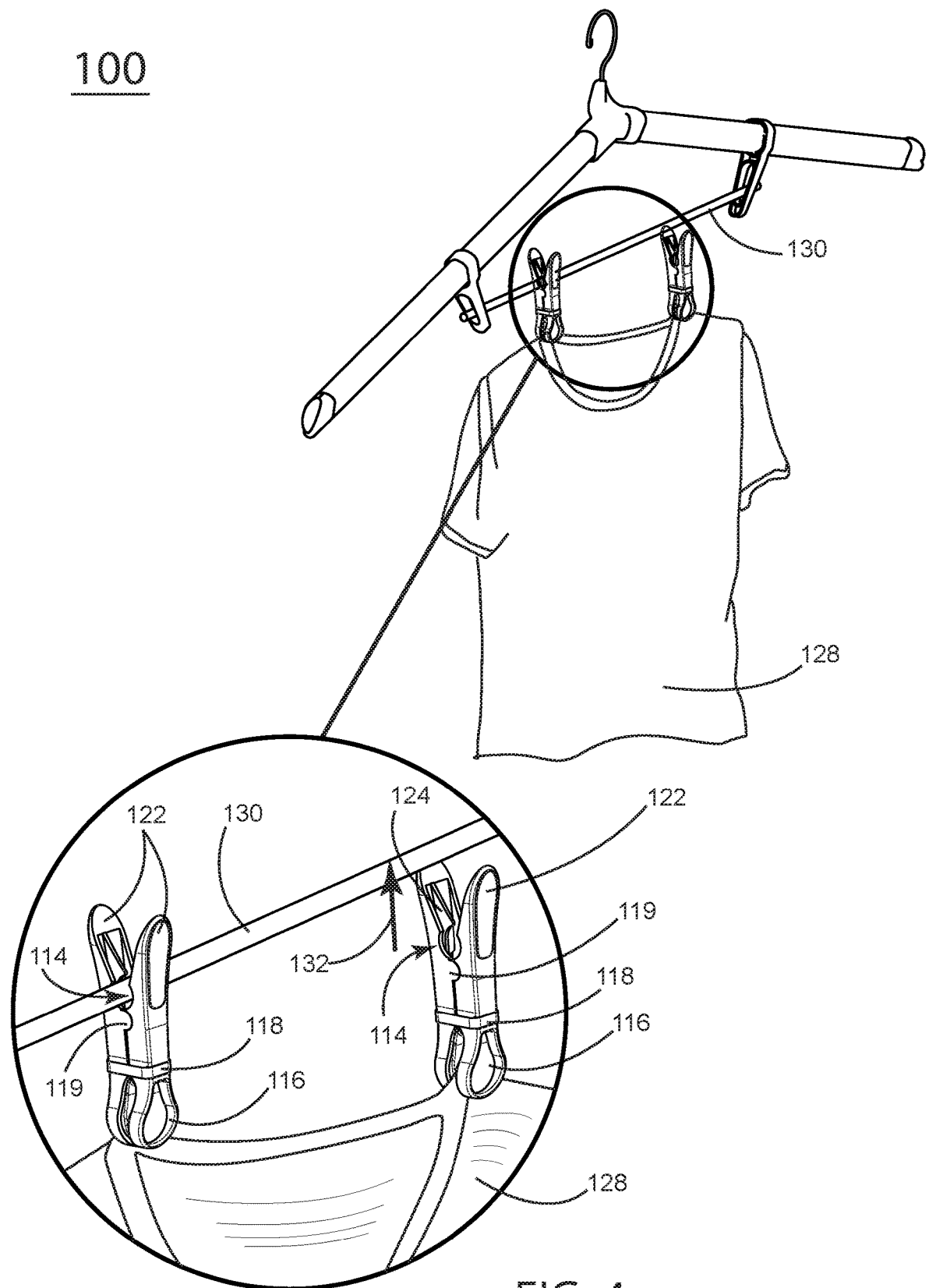
FIG. 4 is a detailed view of the embodiment in use.

In FIG. 4 a detailed view shows the dual-clip clothespin 100 in use. Distal closure ends 116 hold a provided shirt 128. When the proximal ends 122 are brought together the distal ends 116 separate as they pivot over projection 119 and may be placed over the edge of an article of clothing 128. As the proximal end of the clothespin 100 is moved over a rod 130 in an upward direction 132 the rod moves along inclined planes 124, thus spreading the proximal ends 122, separating one prong from the other while flexing the elastic 118. When the rod enters the through-hole 114 the elastic closes the prongs, thus holding the clothespin on the rod 130.

It can be understood by the illustration in FIG. 4 that the weight of a garment and therefore the thickness of fabric affect the clamping force on a rod 130. For example a heavy garment of relatively thick material will cause the distal ends 116 of the clothespin 100 to spread a greater distance than that of the relatively thinner material of a lighter garment. When the distal ends 116 are spread to accommodate a relatively thick material, the force on the elastic 118 is also increased and therefore the force on the opposite side of the pivot 119 results in greater closing or clamping force between the surfaces that make up the through-hole 114 and therefore results in greater clamping force over the rod 130. It can also be seen from the illustration in FIG. 4 that the elastic provides a force to both close the distal ends 116 over a garment while at the same time provides a force for closing over a rod 130.

Figure 5:
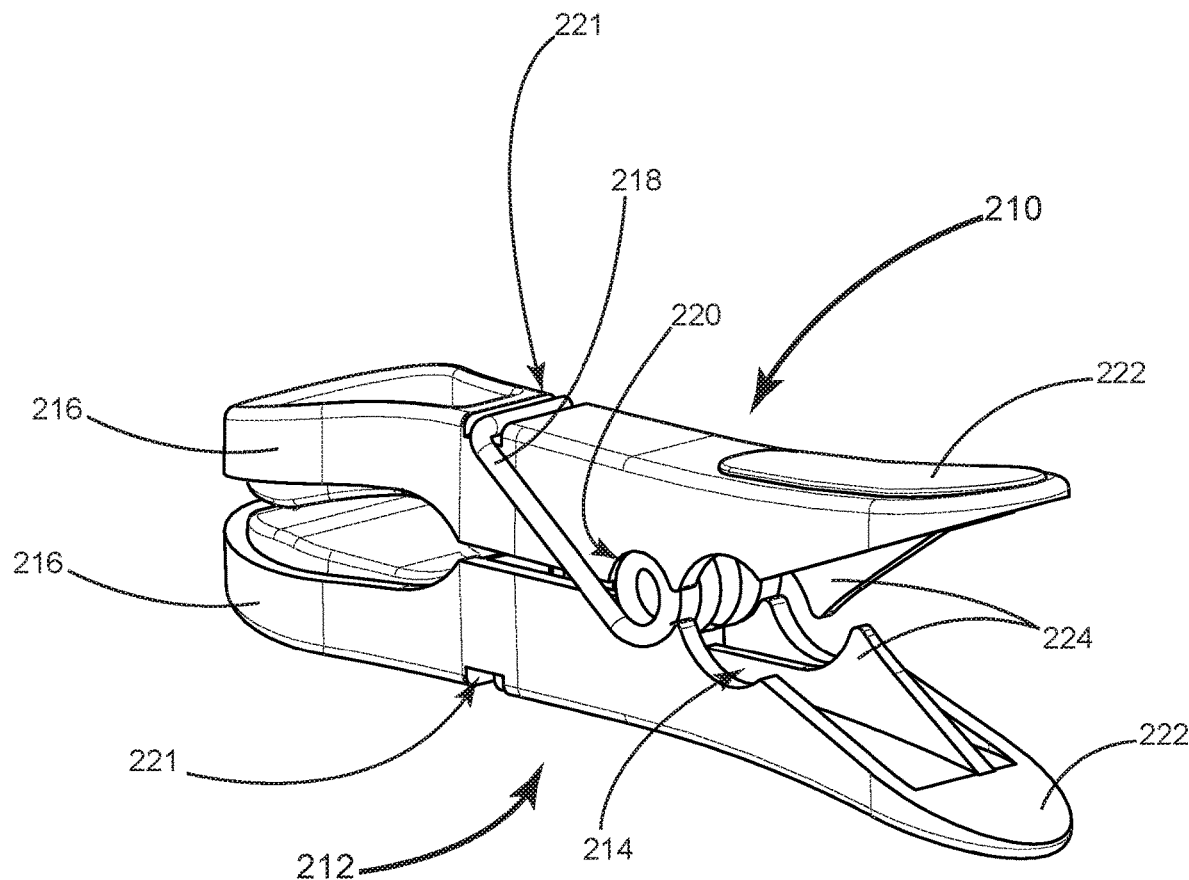
FIG. 5 is an enlarged, rear-perspective view of a second iteration of the embodiment.

FIG. 5 depicts a second iteration 200 in enlarged, rear-perspective view. In this iteration, a typical clothespin spring 218 housed in a groove 220 is used in combination as an opening/closing mechanism instead of the elastic-band combination described above (FIG. 2). This iteration (200, FIG. 5) has an upper prong 210 engaged by spring 218 with a matching lower prong 212. Channels 221 hold two ends of the spring 218 in place. A semi-circular through-hole 214 in the proximal end of each prong 210, 212 acts as a catch at the end of the ramped guide 224 integral to the proximal lever end 222. Parts 214, 210, 212 and 224 are together referred to as a rod clip. In use, the clothespin is manually slid perpendicularly against a provided rod or hanger cross member, so that the provided rod slides along the ramped guide 224 until caught in the through-hole 214. The spring 218 holds the closure ends 216 secured upon a provided garment. One skilled in the art understands that the same apparatus that engages a substantially rigid rod may also be used to engage a substantially flexible clothesline or the like.

Figure 6:
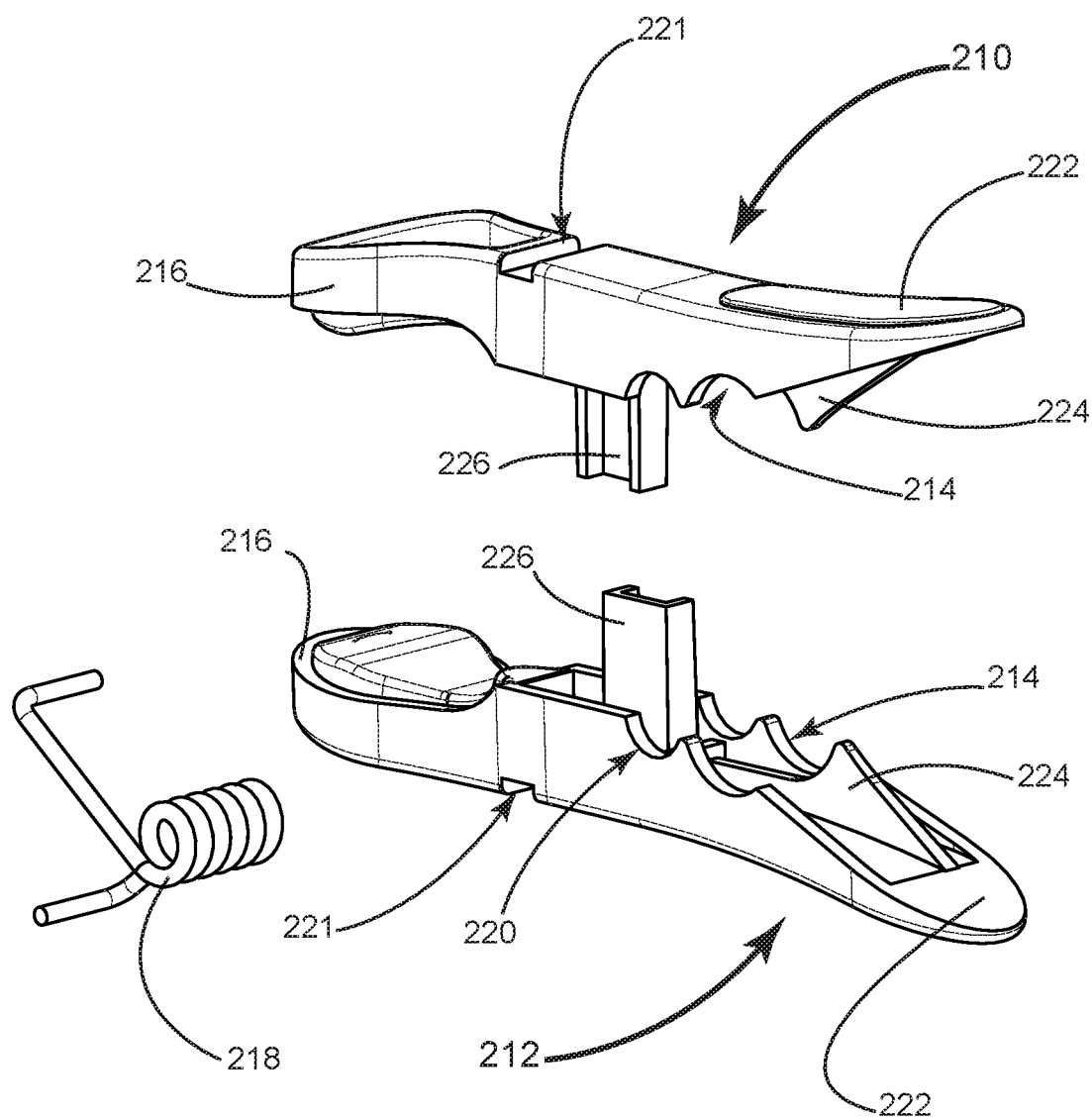
FIG. 6 an exploded, enlarged rear-perspective view of a second iteration of the embodiment.

FIG. 6 depicts the second iteration in exploded, enlarged, rear-perspective view. A two-part inner structural member 226 aligns upper prong 210 to the lower prong 212. Channels 221 hold two ends of the spring 218 in place. Other parts, unchanged and shown for reference, are: semi-circular through-hole 214; closure ends 216; notch 220; proximal lever ends 222; and ramped guide 224.

Figure 7:
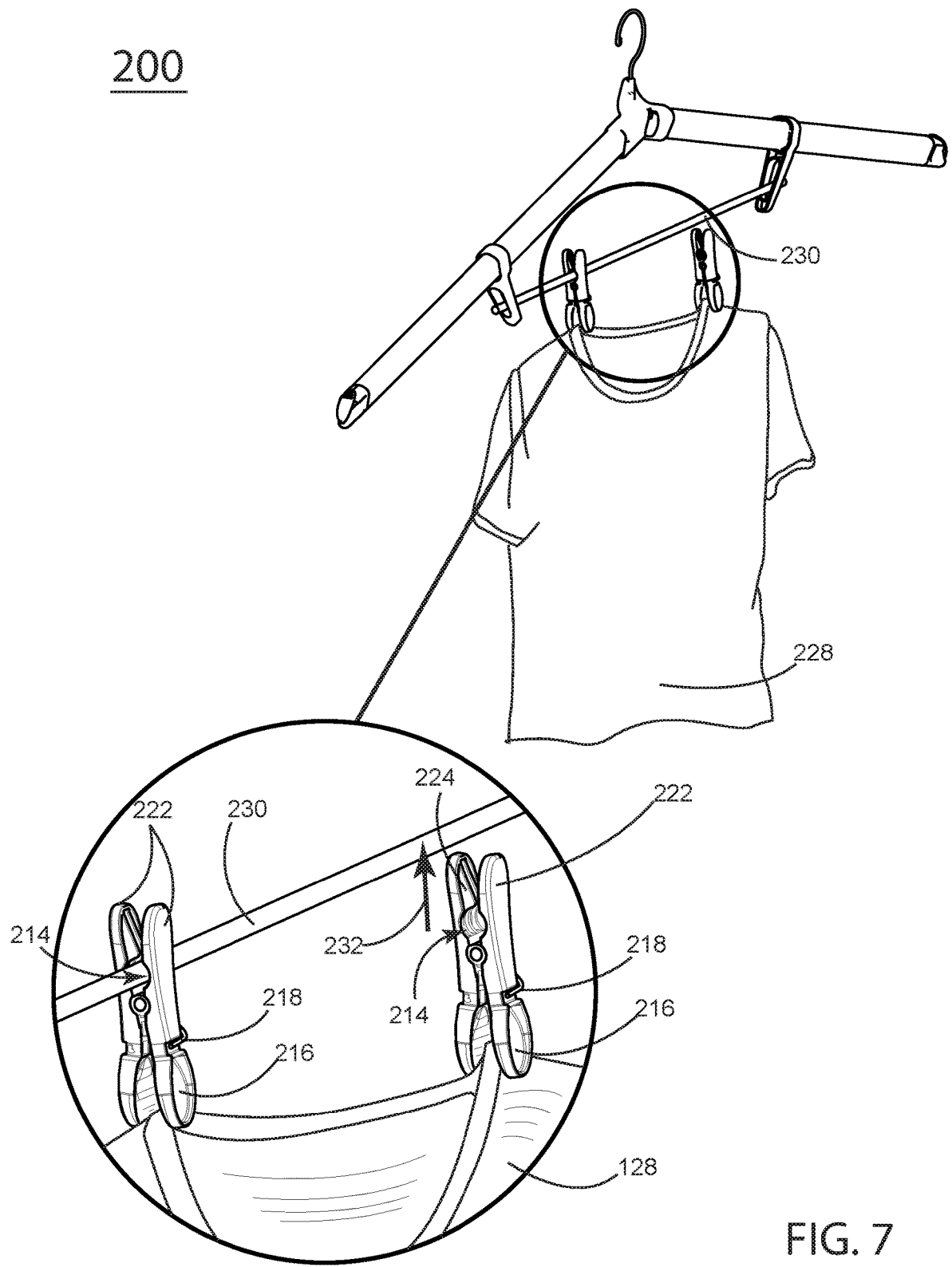
FIG. 7 is a detailed view of the second iteration of the embodiment.

In FIG. 7 a detailed view of the second iteration 200 depicts the dual-clip clothespin in use. Closure ends 216 hold a provided shirt 228. By manually sliding the dual-clip clothespin upward 232 onto a provided rod 230 along the ramped guides 224, the rod catches in the semi-circular through-holes 214 and holds the shirt up onto a provided rod 130 or hanger. The spring 218 holds the closure ends 216 secured upon a provided garment. One skilled in the art understands that the same clip may be used to engage a clothesline or other flexible, substantially cylindrical line or cord.

It can be understood by the illustration in FIG. 7 that the weight of a garment and therefore the thickness of fabric affect the clamping force on a rod 230. For example a heavy garment of relatively thick material will cause the distal ends 216 of the clothespin 200 to spread a greater distance than that of the relatively thinner material of a lighter garment. When the distal ends 216 are spread to accommodate a relatively thick material, the force on the spring 218 is also increased and therefore the force on the opposite side of the pivot 220 results in greater closing or clamping force between the surfaces that make up the through-hole 214 and therefore results in greater clamping force over the rod 230. It can also be seen from the illustration in FIG. 7 that the spring 218 provides a force to both close the distal ends 216 over a garment while at the same time provides a force for closing the through-hole 214 over a rod 230.

The present invention is described above as a preferred example and not intended to be exhaustive or limiting of the invention.

The invention claimed is:
1. A clothespin comprising:
 a first prong identical to a second prong, each prong comprising:
 a proximal end and a distal end; and
 a left side and a right side; and
 a groove perpendicular to a central plane; and
 an elastic member engaged within said grooves; and
 a central plane extending from said proximal end to said distal end, between said right side and said left side of said first prong and said second prong; and
 a first part of a two-part inner structural member fixedly engaged with said first prong and a second part of a two-part inner structural member fixedly engaged with said second prong, each having a flat surface coplanar with said central plane; and
 said first part of said two-part inner structural member of said first prong movably engaged with said second part of said two-part inner structural member of said second prong; and
 a rod clip comprising a through-hole proximal to the proximal end; and
 an inclined plane proximal to said through-hole for slidably engaging a rod into said through-hole; and
 a projection on the left side and a notch on the right side, providing a pivot when the notch of the first prong is engaged with the projection of the second prong; and
 the notch of the second prong is engaged with the projection of the first prong; and
 an elastic member flexibly engaged with said first prong and said second prong; wherein said first part of said two-part inner structural member of said first prong movably engaged with said second part of said two-part inner structural member of said second prong maintains alignment between said first prong and said second prong, and said elastic member holds the distal end of said first prong and said second prong movably engaged about said pivot; and moving away from each other while expanding said elastic member, when said proximal end of said first prong and said proximal end of said second prong are moved closer together; and said inclined plane spreading said first prong away from said second prong against the expansion of said elastic member when a rod is moved over said inclined plane and into said through hole.
2. The clothespin of claim one wherein said first prong and said second prong are comprised of injection-molded plastic.
3. The clothespin of claim one wherein said first prong and said second prong further comprise a co-molded grip proximal to said proximal ends.
4. A clothespin comprising:
 a first prong identical to a second prong, each prong comprising;
 a proximal end and a distal end; and
 a left side and a right side; and
 a groove perpendicular to said central plane; and
 said torsion spring having two ends engaged within said grooves; and
 a central plane extending from said proximal end to said distal end, between said right side and said left side; and a first part of a two-part inner structural member engaged with said first prong and having a flat surface coplanar with said central plane; and a second part of said two-part inner structural member engaged with said second prong and having a flat surface coplanar with said central plane; and said first part of said two-part inner structural member of said first prong movably engaged with said second part of said two-part inner structural member of said second prong; and a rod clip comprising a through-hole proximal to the proximal end; and an inclined plane proximal to said through-hole for slidably engaging a rod into said through-hole; and a notch on the left side and a notch on the right side, and a torsion spring pivotally engaged within said notch of said first prong and said second prong; wherein said first part of said two-part inner structural member of said first prong movably engaged with said second part of said two-part inner structural member of said second prong maintains alignment between said first prong and said second prong, and said torsion spring holds the distal end of said first prong and said second prong movably engaged about said pivot; and moving away from each other while rotating said torsion spring, when said proximal end of said first prong and said proximal end of said second prong are moved closer together; and said inclined plane spreading said first prong away from said second prong against the torsion of said torsion spring when a rod is moved over said inclined plane and into said through-hole.

5. The clothespin of claim six wherein said first prong and said second prong are comprised of
injection-molded plastic.

6. The clothespin of claim six wherein said first prong and said second prong further comprise:
a co-molded grip proximal to said proximal ends.

* * * * *